United States Patent [19]
Turnbull et al.

[11] Patent Number: 5,590,189
[45] Date of Patent: Dec. 31, 1996

[54] METHOD OF OPERATING A MICROPROCESSOR CONTROLLED TELEPHONE SET

[75] Inventors: Robert B. Turnbull, Calgary; Kristin J. Travis, Nepean; Piotr T. Goszczynski, Cochrane; Susan J. McGarry, Ottawa; Michel J. Brisebois, Chelsea, all of Canada

[73] Assignee: Northern Telecom Ltd., Montreal, Canada

[21] Appl. No.: 354,658

[22] Filed: Dec. 13, 1994

[30] Foreign Application Priority Data

Dec. 30, 1993 [JP] Japan ..................................... 5-349934

[51] Int. Cl.⁶ .................................................. H04M 1/00
[52] U.S. Cl. ........................... 379/356; 379/142; 379/355
[58] Field of Search ..................................... 379/355, 356, 379/357, 201, 142

[56] References Cited

U.S. PATENT DOCUMENTS

| | | | |
|---|---|---|---|
| 5,267,308 | 11/1993 | Jokinen et al. | 379/354 |
| 5,303,288 | 4/1994 | Duffy et al. | 379/354 |
| 5,371,785 | 12/1994 | Marcinkiewicz | 379/201 |
| 5,390,236 | 2/1995 | Klausner et al. | 379/354 |

Primary Examiner—Krista M. Zele
Assistant Examiner—Daniel S. Hunter
Attorney, Agent, or Firm—Thomas R. Vigil

[57] ABSTRACT

A method of operating a microprocessor controlled telephone set having a microcomputer, user-data memory, and a plurality of function-keys, comprising the steps of: accessing said user data memory by defining a set of utility functions in a physical access module; translating a logical access request originated by a user of said telephone set to a corresponding utility function; and generating a logical access request in response to activation of a function-key.

5 Claims, 5 Drawing Sheets

METHOD OF OPERATING A MICROPROCESSOR CONTROLLED TELEPHONE SET

BACKGROUND OF THE INVENTION

1. Field of the Invention

The present invention is directed to telephone sets in general, and in particular to electronic subscriber sets for both residential and business use. More particularly still, it is directed to a flexible, user responsive, micro-processor controlled telephone set with generic directory list memory accessed by the user via dialpad and softkeys, without the complication of a computer keyboard.

2. Prior Art of the Invention

With the proliferation of call-waiting (CW) and calling-number identification (CNID) service, subscriber telephone sets have acquired modem, data processing and display capability. Indeed, Motorola provides since 1992 a caller ID integrated circuit with on-chip ring detection under the description MC145447 for use in telephones.

Furthermore, modem cental offices (CO) are capable of providing enhanced services, such as in U.S. Pat. No. 4,661,975 granted Apr. 28, 1987 to S. M. Brecher for Enhanced Call-Waiting Service. The patent discloses a process for controlling a telephone switching system which gives a telephone customer alternative ways of handling an incoming call while that customer is engaged with an existing call. The conventional call-waiting process is modified by permitting the dual tone multifrequency buttons to be operated for a predetermined short interval after the call-waiting signal is given to the called customer responsive to the particular tone signals keyed. The switching system is enabled to send a busy tone or a predetermined announcement to the calling party or to reroute the calling party to an alternate destination.

U.S. Pat. No. 4,879,743 granted Nov. 7, 1989 to E. T. Burke et al, on the other hand, discloses a sophisticated PBX system for use with adjuncts such as a programmable voice message system, and passes data messages to the adjunct via DTMF tones.

U.S. Pat. No. 4,924,496 granted May 8, 1990 to R. Figa et al discloses an automatic incoming telephone call number display system for detecting an incoming call and identifying the party associated with the incoming call number. The system includes a directory of telephone numbers and parties associated with those numbers. Circuitry detects the origin telephone number of an incoming telephone call and compares that number with numbers in the directory for identifying the calling party. A display permits the user to view the incoming call number and party associated with that number. The incoming telephone call number display system disclosed includes a liquid crystal display, an alpha keypad and a numeric keypad.

The above mentioned United States patents are incorporated herein by reference.

SUMMARY OF THE INVENTION

In order to fully utilize the enhanced services now available from telephone company central offices (COs), and yet to maintain user friendliness and ease of programming, the telephone set of the present invention utilizes uniquely structured microprocessor control of the telephone set operation. Such unique structure involves the use of a non-volatile memory (NVRAM) for storing telephone directory lists, redial lists, and the like, which is hierarchically organized beginning with the physical memory access by means of utility functions, and progressing to user friendly functions accomplished by hard/soft keys and display prompts.

Accordingly, the present invention provides a method of operating a microprocessor controlled telephone set having a microcomputer, user-data memory, and a plurality of function-keys, comprising the steps of: accessing said user data memory by defining a set of utility functions in a physical access module; translating a logical access request originated by a user of said telephone set to a corresponding utility function; and generating a logical access request in response to activation of a function-key.

BRIEF DESCRIPTION OF THE DRAWINGS

The preferred embodiment of the present invention will now be described in detail in conjunction with the drawings, in which.

DETAILED DESCRIPTION OF THE PREFERRED EMBODIMENT

Figure 1:
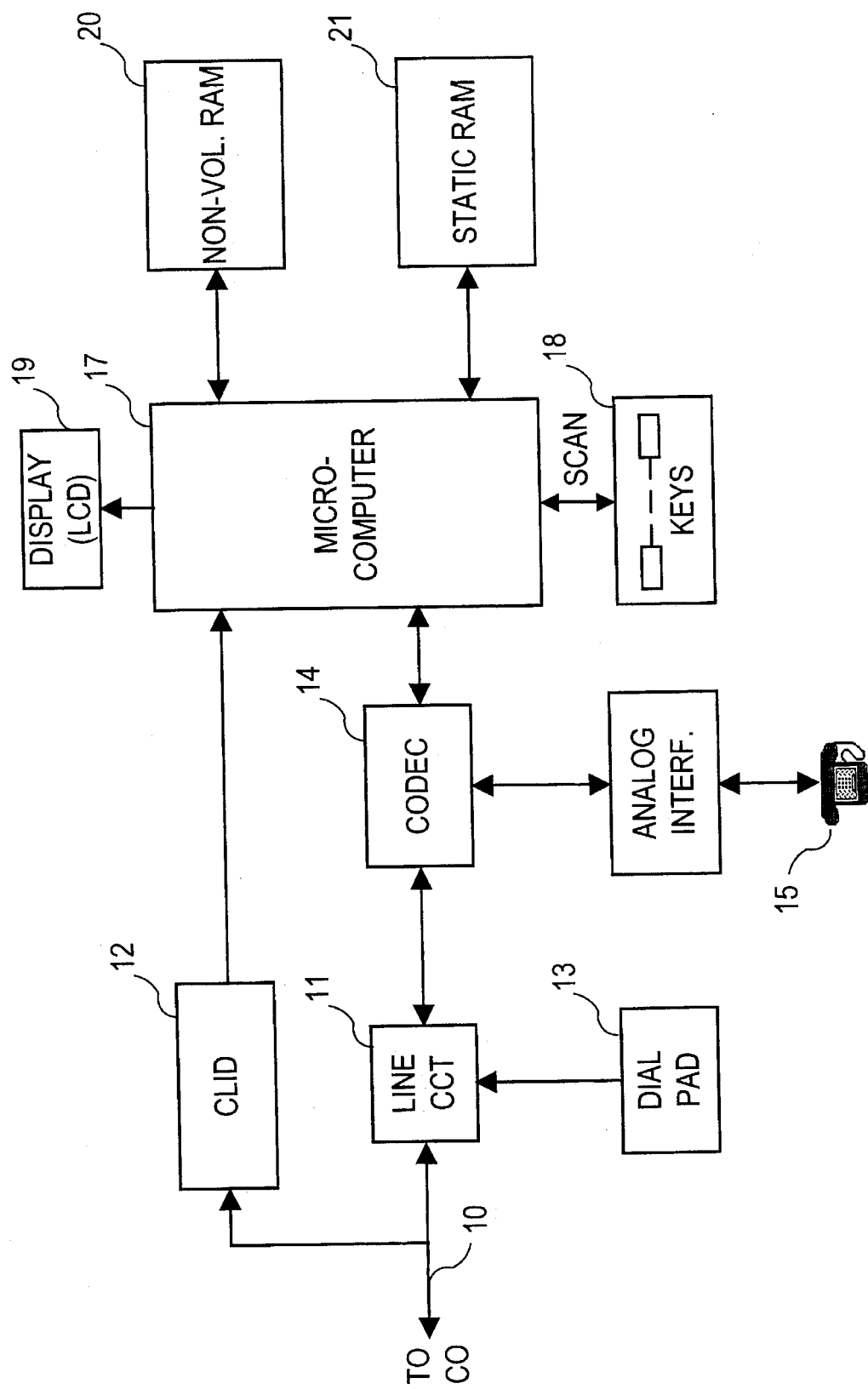
FIG. 1 is a high level circuit block schematic diagram of a telephone set according to the present invention.

Referring to FIG. 1 of the drawings, the telephone set of the preferred embodiment comprises at least one telephone line 10 (connecting it to the central office CO, not shown) connected to a line circuit 11 and a calling line identification device (CLID) 12. The line circuit 11 is connected to a DTMF dial pad 13, and communicates bi-directionally with a coder/decoder (CODEC) 14, which communicates with a handset 15 via an analog interface 16. The CODEC 14 also communicates with a microcomputer 17, which scans the keys of keyboard 18 of the telephone, and controls an LCD display 19. The microcomputer 17 reads and writes a non-volatile RAM (NVRAM) 20, as well as a static RAM 21.

Figure 2:
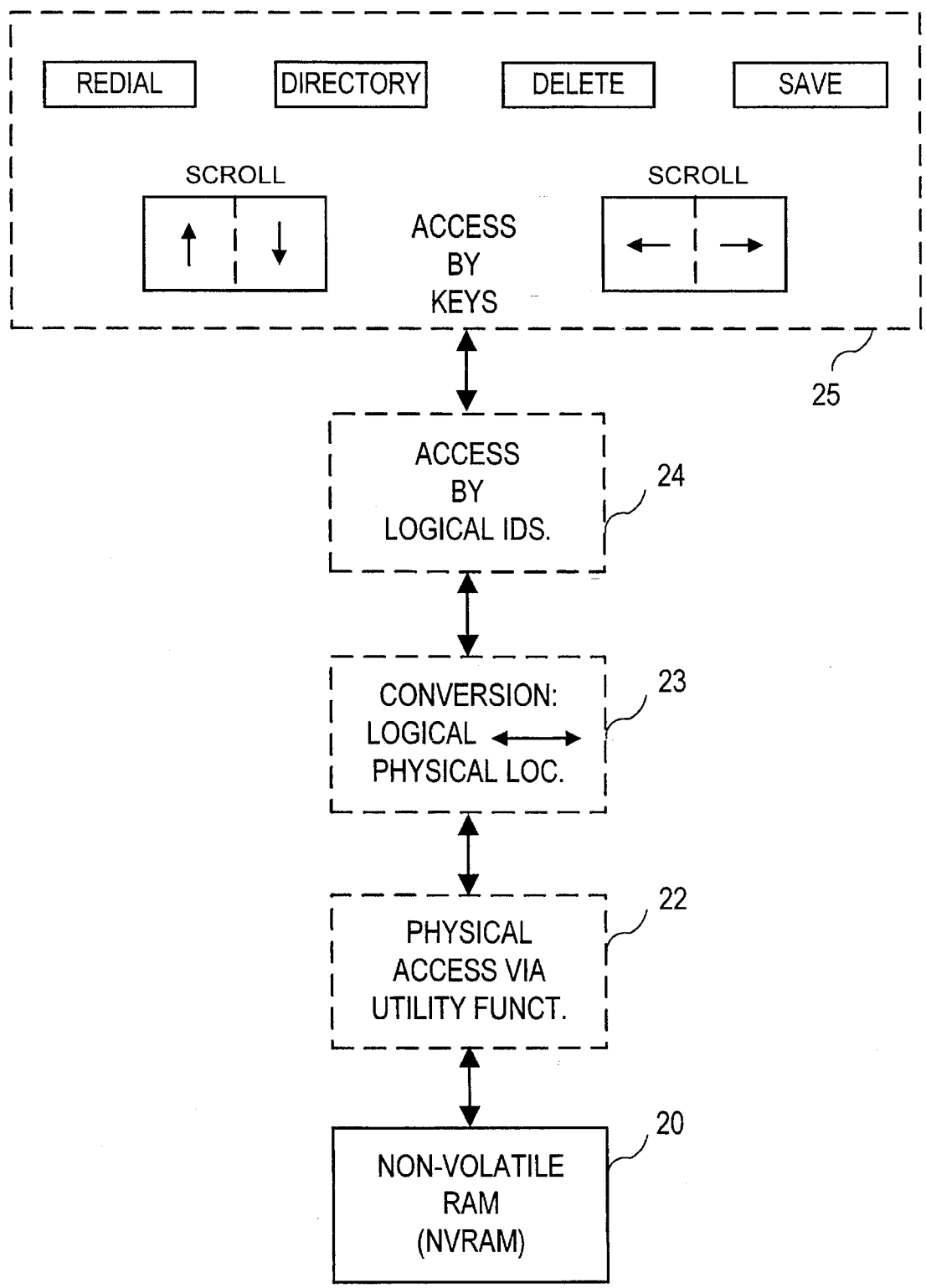
FIG. 2 is a block schematic illustrating the method of carrying out the method of the present invention in the telephone set of FIG. 1.

Referring to FIG. 2, it shows the NVRAM 20 and how it is managed to yield the generic directory link list memory. The object of the generic list memory design is to provide a logical system that structures the external memory NVRAM 20 storage in form suitable to functionalities required by various features in the telephone. To achieve this object the hard- and firmware are partitioned into five levels. The very bottom level, of course, is the NVRAM 20 itself, with the next higher level 22 consisting of utility functions that provide direct physical access to the NVRAM 20. On top of this level there is the lowest logical level 23. Functions at this level are allowed to access the NVRAM 20 locations, but only based on logical specifications rather than on physical ones. Also, this level provides automatic conversion between logical and physical descriptions of the NVRAM 20 locations. Primitives from this level support the whole design but they are not the user functions and there is no need to use them directly. Above, this level, there is a logical level 24, which is the first user accessible level. It gives the ability to access link list bytes based on purely logical identification record number/byte number within the record. The final level provides the user with several functions such as:

scroll up/down and left/right through the link lists, bulk access to predefined fields, such as name and number, manage and maintain link list records, and initialize and verify link lists.

Figure 3:
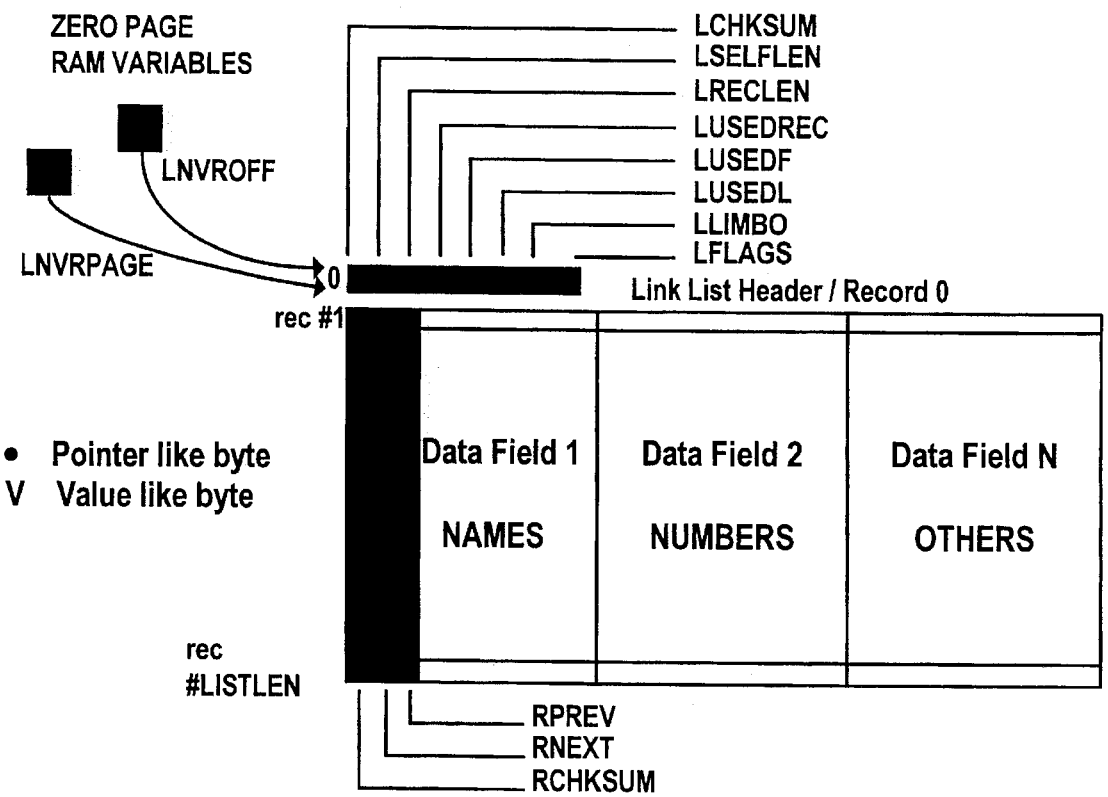
FIG. 3 is a schematic diagram showing the internal organization of the NVRAM 20 memory shown in FIG. 2.

The NVRAM 20 is an external memory resource with 8 Kb byte capacity. The NVRAM 20 is organised in 32 pages of 256 bytes in each page. Therefore, a particular byte in the NVRAM 20 is identified by an address composed of 5 bits for PAGE and 8 bits for OFFSET (8 Kb=8192 bytes=$2^5 \times 2^8$=32 pages×256 bytes. This is the physical layout of the memory, and the utility level 22 provides access to the NVRAM 20. At the next level 23, the physical memory structure is converted into a logical layout by means of the link list concept. The record in the link list comprises the data area for storage information, and the linkage area to maintain certain relationships between records. For error protection the records are protected with record check sums. Further, the link list has a header part to keep general description/self maintenance information. The header is error protected with a header check sum. To be able to work with several different link lists located in different locations in the NVRAM 20 some global identification is needed. This identification simply determines where the particular link list begins in the NVRAM 20. The logical structure of the link list is shown in FIG. 3, where the abbreviations mean the following:

| | |
|---|---|
| LNVRPAGA/LNVROFF | unique location in the NVRAM of particular link list (global identification by physical pointer like bytes) |
| LCHKSUM | header check sum byte |
| LSELFLEN | number of records in the link list |
| LRECLEN | number of bytes in the record's data area |
| LUSEDREC | number of records currently in use |
| LUSEDF | record number of the first record in use (logical pointer like byte) |
| LUSEDL | record number of the last record in use (logical pointer like byte) |
| LLIMBO | record number of the first record in limbo (logical pointer like byte) |
| RCHKSUM | record check sum byte |
| RNEXT | record number of the next logical record (logical pointer like byte) |
| RPREV | record number of the previous logical number (logical pointer like byte) |

To provide the higher level memory management system primitives are provided to access the memory on the lowest level. They are used to modify the NVRAM 20 address, to read a byte from NVRAM 20 and to write a byte into the NVRAM 20. These utilities are the black boxes from the perspective of the link list. It does not matter how address modifications, reads and writes are happening. Common ground for all utilities is the assumption that the NVRAM 20 addresses are always maintained in the processor's index registers. Index register X keeps the offset component of the NVRAM 20 address, and index register Y keeps the page component of the NVRAM 20 address. The NVRAM 20 address in the X, Y registers simply says which NVRAM 20 byte should be read or written, or which is the initial entry value for address modification action. There are two address modification functions:

1. INCADD—increments NVRAM address to the next byte. Simply X register is incremented by 1. When address reaches the end of the page carry over increment takes place—X register becomes zero and the Y register is increment by 1. This function does not use processor's Accumulator and just preserves its value over the function execution.

Example:

| | | |
|---|---|---|
| Before call | Acc = n | Acc = m |
| | X = 32 | X = 255 |
| | Y = 5 | Y = 24 |
| After call | Acc = n | Acc = m |
| | X = 33 | X = 0 |
| | Y = 5 | Y = 25 |

2. ADCADD—moves NVRAM address ahead relative to the initial entry address specified in X, Y registers, by the number of bytes specified in Accumulator. Value provided in Accumulator is added into the X register in the carry over fashion. When carry over case takes place the Y register is incremented by 1.

Example:

| | | |
|---|---|---|
| Before call | Acc = 50 | Acc = 12 |
| | X = 33 | X = 245 |
| | Y = 5 | Y = 24 |
| After call | Acc = 50 | Acc = 12 |
| | X = 83 | X = 2 |
| | Y = 5 | Y = 25 |

NVRAM access functions are as follows:

1. RDNVR—reads the byte from NVRAM. Byte location in specified in the standard way in X, Y registers (OFFSET, PAGE respectively). After the function call the read in byte is placed in Accumulator and X, Y registers remain unchanged.

Example:

| | |
|---|---|
| Before call | Acc = N/A |
| | X = 32 |
| | Y = 5 |
| After call | Acc = NVRAM byte from location 32/5 |
| | X = 32 |
| | Y = 5 |

2. WRNVR—writes the byte into NVRAM. Again the byte location is specified in the X, Y registers. Accumulator contains the byte value to be written into NVRAM and of course remains unchanged over the function call.

Example:

| | |
|---|---|
| Before call | Acc = Some value |
| | X = 32 |
| | Y = 5 |
| After call | Acc = Some value |
| | X = 32 |
| | Y = 5 |

There is also a need for the utility type function (RUNCHKS) that calculates the check sum over N consecutive bytes in the NVRAM 20. The RUNCHKS function adds up byte values from N consecutive locations in the NVRAM 20. The process starts at the location (OFFSET+1)$_w$ith carry/PAGE; where OFFSET and PAGE are provided in the X/Y registers, respectively. The number N of bytes to be included in the check sum calculation is provided in an Accumulator. The output value is a complement value of the calculated sum and is placed in Accumulator.

Example:

|  |  |
|---|---|
| Before call | Acc = N |
|  | X = 0 |
|  | Y = 5 |
| After call | Acc = CheckSum |
|  | X = 0 |
|  | Y = 5 |

The above organization provides a generic way to manipulate any of the NVRAM 20 lists. It ensures that functions in the system are independent from the physical location of any particular list. However, since the logical operations take place in some physical location, it is necessary to determine a physical point of reference. For this purpose two RAM bytes, LNVOFF and LNVRPAGE, are used as follows:

Example: Set the reference to YOUR Link List

```
LDM #YOUR_LIST_OFF,LNVROFF    ;offset component of the
reference
LDM #YOUR_LIST_PAGE,LNVRPAGE  ;page component of the
reference
where Your Link List Address: #YOUR_LIST_OFF - value from 0 to 255
                              #YOUR_LIST_PAGE - value from 0 to 32
```

Figure 4:
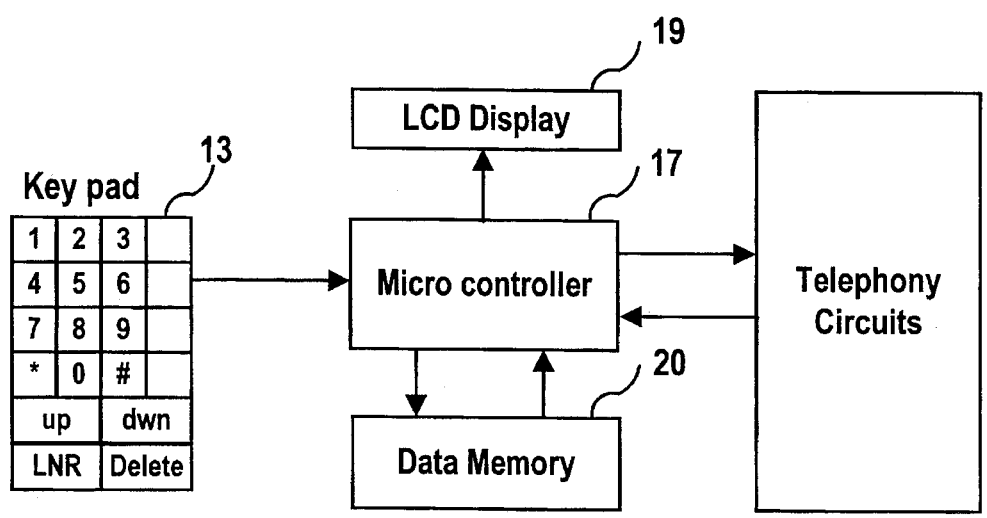
FIG. 4 is a schematic diagram showing components of the telephone for use in a redial directory list.
Figure 5A:
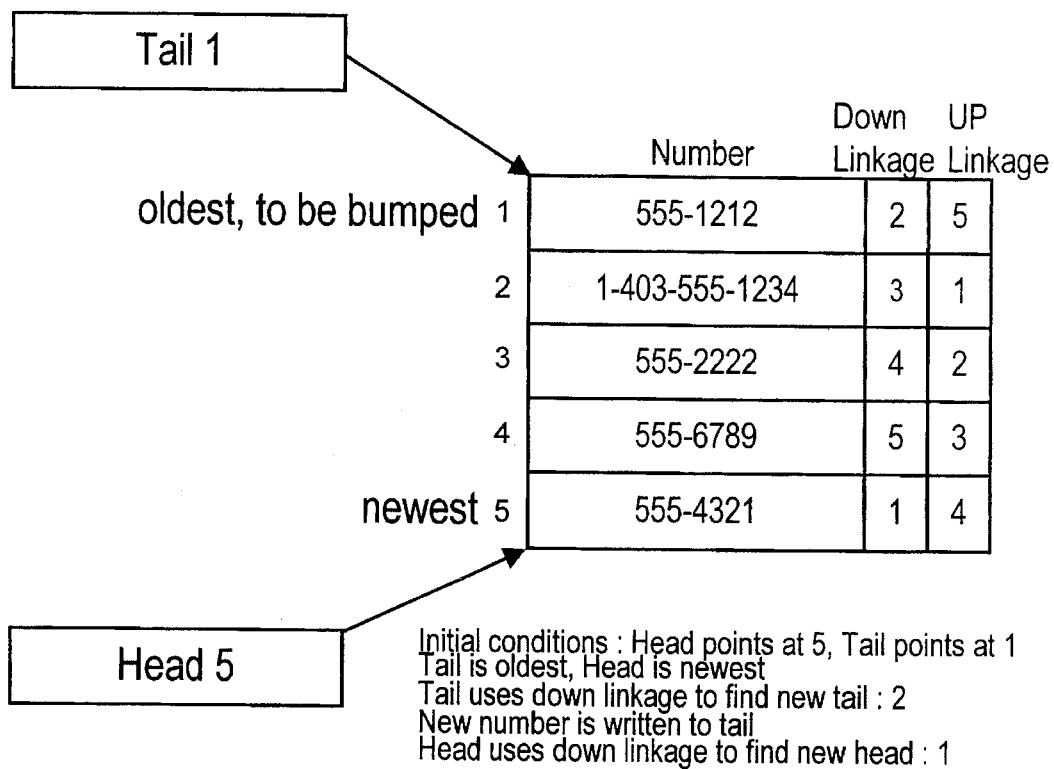
FIG. 5a and 5b illustrate the manner of operation of the redial directory list.
Figure 5B:
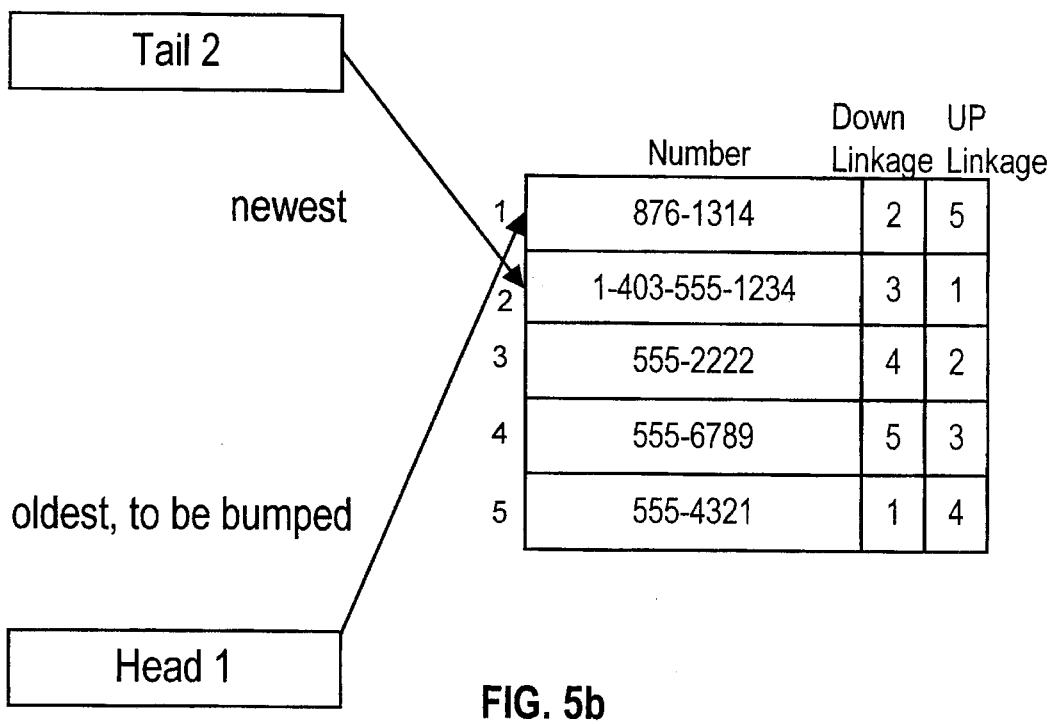

An example of a directory list is the redial list, which gives sequential access by scrolling to the last, say, five dialed telephone numbers. This feature is initiated by pressing the REDIAL key, which retrieves the first entry from the last numbers register (LNR) for display. This feature will now be described with reference to FIGS. 4 and 5a and 5b.

The user may review all last numbers by pressing the REDIAL (or LNR) key and using UP and DOWN scroll keys. The numbers are displayed on the LCD screen and they may be re-dialed by pressing DIAL key.

The registers for the last five numbers are doubly linked in a circular fashion. Each register contains a field for the dialed number, a field for the name (if the name is supported), a field that contains the address of the next register, and a field that contains the address of the previous register. This is called a "Doubly Linked List". Three pointers are maintained that track the newest register (head pointer), oldest register (tail pointer) and current viewing position (scroll pointer).

When a new number should be placed in the Redial list, the oldest entry is located. This can always be found be use of the tail pointer. The oldest entry is purged from the list. The tail pointer is changed to point to the second oldest entry which is now the oldest entry. The new number is put in the place of the oldest number and the head pointer is updated to point to this new entry, now the newest entry. The pointers are updated by using the Down linkage only. In this way the oldest number is always replaced with the newest number, the chronological order is maintained and the number do not have to be copied from register to register.

When viewing the list of LNRs the user presses Up and Down scroll keys. With each key press, the Up or Down linkage is used to locate the next or previous register. The content of that register is copied to a screen so the user can see the number. The double linkage provides the ability to navigate in forward or reverse order. The scroll pointer always points to the currently viewed register. When the user initially presses the REDIAL (LNR) key, the Scroll pointer is forced equal to the Head pointer so the last dialled number (newest) is seen first.

When the user lifts the handset or presses the DIAL key while viewing the contents of an LNR register, the scroll pointer is used to extract the number to be re-dialed. That number is copied to the dialing buffer where it is used to drive a DTMF tone generator. As that number is dialed out, it is again collected in a buffer. At the termination of that call the same sequence of events described above will be followed. If the number dialed has not been changed (edited or digits added) it will fail the test for duplicates and the redial list will not be updated. If the number has been modified in any way it will pass the test for duplicates and will be placed into the Redial list.

Figure 6:
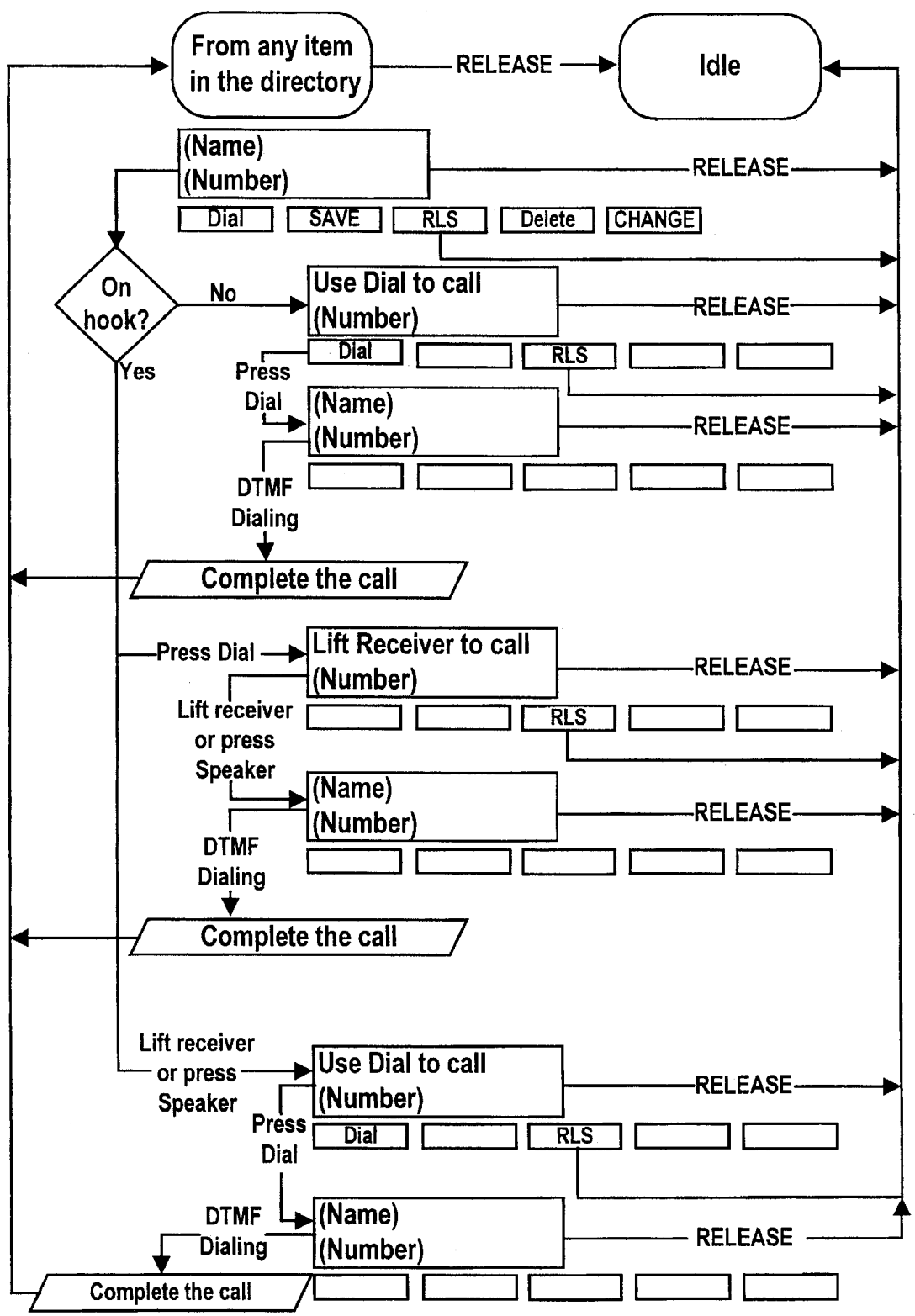
FIG. 6 is a flow diagram illustrating the operation of telephone directory lost using he same generic memory organization.

Similar to the redial lost function, FIG. 6 shows a flow diagram of a telephone directory (list) function.

The directory list is a 64 entry (name and number), stored in the in non-volatile memory. Numbers can be added or deleted from the list, names can be attached or edited, and calls can be placed from the list. The directory is accessed at any time by pressing a Directory hardkey. If the terminal is off-hook, the current display will be over-written, but the call state will not be disrupted. To add entries, name and number can be saved into the directory from the display by pressing the SAVE key, e.g. whenever there is caller ID information displayed. This applies to incoming or outgoing calls, call waiting calls, entries from the network caller's list, or entries from any other calling features.

The directory list is organized in a circular alphabetical order (scroll down for As, scroll up for Zs). Entries which have no attached name are listed in numerical order at the beginning of the list (before the As). The directory contents can be viewed by using the scroll keys and navigating one entry at a time. The dialpad provides a means of jumping down the list Pressing "6" once, for example, will advance to the beginning of the "M"s. Pressing "6" a second time will advance the list to the "N"s. The scroll keys can still be used to locate a specific entry. To place a call to the entry currently displayed the user lifts the receiver or presses the DIAL key.

What is claimed is:

1. A method of operating a microprocessor controlled telephone set having a microcomputer, user-data memory, and a plurality of function-keys, comprising the steps of: storing in said user-data memory a plurality of logical link lists associating records storage areas with each other by storing and updating an index of at least the record number of the first record in use, the record number of the last record in use, the record number of the first record in limbo, the record number of the next record and the record number of the previous record; accessing said user data memory by defining a set of utility functions in a physical access module which reads and writes the memory; translating a logical access request originated by a user of said telephone set to a corresponding utility function; and said logical access request having been generated in response to activation of a function-key.

2. A method as claimed in claim 1, wherein each of said logical link lists is identified by a unique location address in said user data memory.

3. A method as claimed in claim 2, wherein each of said logical link lists further storing the number of records linked by the link list.

4. A method as claimed in claims 1, 2 or 3, wherein one of said logical links lists is a doubly linked circular redial list, further storing the numbers of the newest, oldest and currently accessed record.

5. A method as claimed in claims 1, 2 or 3, wherein one of said logical link lists is a directory list of telephone numbers.

* * * * *